(12) United States Patent
Song et al.

(10) Patent No.: US 9,727,970 B2
(45) Date of Patent: Aug. 8, 2017

(54) METHOD AND APPARATUS FOR GENERATING HOLOGRAM

(71) Applicant: SAMSUNG ELECTRONICS CO., LTD., Suwon-si (KR)

(72) Inventors: Hoon Song, Yongin-si (KR); Hojung Kim, Suwon-si (KR); Juwon Seo, Osan-si (KR); Hongseok Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/636,934

(22) Filed: Mar. 3, 2015

(65) Prior Publication Data
US 2016/0041524 A1  Feb. 11, 2016

(30) Foreign Application Priority Data

Aug. 6, 2014  (KR) .................. 10-2014-0101101

(51) Int. Cl.
| | |
|---|---|
| *G03H 1/08* | (2006.01) |
| *G02B 5/32* | (2006.01) |
| *G03H 1/26* | (2006.01) |
| *G06T 7/00* | (2017.01) |
| *G03H 1/22* | (2006.01) |
| *G03H 1/02* | (2006.01) |

(52) U.S. Cl.
CPC .......... *G06T 7/0081* (2013.01); *G03H 1/0808* (2013.01); *G03H 1/2294* (2013.01); *G03H 2001/0228* (2013.01); *G03H 2001/2271* (2013.01); *G03H 2210/454* (2013.01); *G03H 2226/02* (2013.01)

(58) Field of Classification Search
CPC ...... G03H 1/2294; G03H 1/0808; G03H 1/08; G03H 1/0891; G03H 2001/2271; G03H 1/0866; G03H 2226/02; G03H 2210/45; G03H 2210/454; G03H 2225/61; G03H 2001/0228; G06T 15/00; G06T 2200/04; G06T 7/0081
USPC .............................. 359/9, 10, 21, 22, 24, 35
See application file for complete search history.

(56) References Cited

U.S. PATENT DOCUMENTS

| | | |
|---|---|---|
| 8,325,401 B2 | 12/2012 | Schwerdtner |
| 8,368,743 B2 | 2/2013 | Schwerdtner et al. |
| 8,395,616 B2 | 3/2013 | Schwerdtner |

(Continued)

FOREIGN PATENT DOCUMENTS

KR     10-1366116 B1     2/2014

*Primary Examiner* — Jade R Chwasz
(74) *Attorney, Agent, or Firm* — Sughrue Mion, PLLC

(57) ABSTRACT

A method of generating a hologram includes receiving three-dimensional (3D) image data, dividing 3D image data into data groups which are independent from one another, by a first processor; calculating, from at least one of the data groups, hologram values to be displayed at respective positions on a hologram plane, by the first processor; calculating, from at least another one of the data groups, hologram values to be displayed at the respective positions on the hologram plane by a second processor, and summing the calculated hologram values for each of the respective positions on the hologram plane, by the first processor or the second processor, or by the first processor and the second processor in parallel.

14 Claims, 13 Drawing Sheets

(56) References Cited

U.S. PATENT DOCUMENTS

2006/0250671 A1* 11/2006 Schwerdtner ........ G03H 1/2286
  359/9
2011/0096145 A1   4/2011 Schwerdtner
2011/0157667 A1*  6/2011 Lacoste ............. G02B 27/2271
  359/9
2013/0106844 A1*  5/2013 Hong ................ H04N 13/0022
  345/419

* cited by examiner

METHOD AND APPARATUS FOR GENERATING HOLOGRAM

CROSS-REFERENCE TO RELATED APPLICATIONS

This application claims priority from Korean Patent Application No. 10-2014-0101101, filed on Aug. 6, 2014 in the Korean Intellectual Property Office, the disclosure of which is incorporated herein in its entirety by reference.

BACKGROUND

1. Field

Methods and apparatuses consistent with exemplary embodiments relate to a method and apparatus for generating a hologram to display a holographic three-dimensional image.

2. Description of the Related Art

A holographic three-dimensional (3D) image display apparatus may display a more natural 3D image than a binocular parallax type 3D image display apparatus.

Recently, as 3D movies are increasingly being released, technologies related to a 3D image are being widely researched. In particular, research in developing an apparatus for generating, in real time, a hologram having high image quality by using a complex spatial light modulator (SLM) capable of simultaneously controlling amplitude and phase of light is actively being conducted.

A hologram is a recording of an interference pattern of an object wave and a reference wave. When the hologram is irradiated by the reference wave, the object wave is reproduced. Recently, a computer generated hologram has been used to form the interference pattern. In this case, the amount of calculation for a hologram value for each position of a hologram plane is very large.

For example, when forming an ultra high definition (UHD) image having a 4K (4096×2160) resolution or higher, an iterative calculation of more than 4096×2160× number of frames×number of layers in a depth direction×3 (colors R, G, and B) is needed.

Recently, data processing speeds of a central processing unit (CPU) and a graphics processing unit (GPU) have been increasing and, in particular, most high performance processors are based on a multi-core. In the case of a CPU, a multi-core processor equipped with 2 to 8 or more processor cores is the norm. In the case of a GPU, a many-core processor equipped with tens to hundreds of cores is the norm. Accordingly, there is a demand for a method of parallel processing the above calculation by using the multi-core or many-core processors.

SUMMARY

Exemplary embodiments provide a method and apparatus for generating a hologram which may calculate a computer generated hologram at high speed.

Additional aspects will be set forth in part in the description which follows and, in part, will be apparent from the description, or may be learned by practice of the presented embodiments.

According to an aspect of an exemplary embodiment, there is provided a method of generating a hologram, the method including: dividing 3D image data into data groups which are independent from one another, by a first processor; calculating, from at least one of the data groups, hologram values to be displayed at respective positions on a hologram plane, by the first processor; calculating, from at least another one of the data groups, hologram values to be displayed at the respective positions on the hologram plane by a second processor, and summing the calculated hologram values for each of the respective positions on the hologram plane, by the first processor or the second processor, or by the first processor and the second processor in parallel.

The dividing may include dividing the 3D image data into the data groups based on primary color components of a color model set for the first processor.

The primary color components may correspond to red, green, and blue color components.

In the dividing of the 3D image data, image data of each of the data groups may be divided into a plurality of depth images based on depth information from the hologram plane.

The calculated hologram values may be obtained in parallel by dividing the 3D image data into 3N groups, and N is a number of the plurality of depth images.

The calculated hologram values may be obtained in parallel by dividing the 3D image data into three groups having different color information, and calculations with respect to the plurality of depth images are sequentially processed in each of the three groups.

The calculated hologram values may be obtained in parallel by dividing the 3D image data into N groups having different depth information, and N is a number of the plurality of depth images, and calculations based on the primary color components are sequentially processed in each of the N groups.

The method of generating the hologram may further include, with respect to each of plane images of the 3D image data defined by the primary color components and the depth information: calculating a diffraction limit; dividing each of the plane images into a plurality of divided images, each of the plurality of divided images having a size equal to the diffraction limit multiplied by the diffraction limit; and forming a plurality of sub-images by gathering image data at a same matrix position from each of the plurality of divided images.

The dividing may include: analyzing a calculation time based on an amount of color image data included in the 3D image data; and dividing and distributing hologram calculation, to the first processor and the second processor, with respect to the plurality of sub-images formed for each of the primary color components and depth images.

In the calculating of the hologram value by the first processor and/or the second processor, hologram values with respect to the plurality of sub-images may be calculated, the calculated hologram values may be summed, and a hologram value with respect to each of the plane images defined by the primary color components and the depth information may be obtained.

According to an aspect of another exemplary embodiment, there is provided a non-transitory computer readable storage medium storing a program that is executable by a computer to perform the method of generating the hologram According to an aspect of another exemplary embodiment, there is provided an apparatus for generating a hologram, the apparatus including: a controller including a first processor and a second processor configured to generate a hologram signal from 3D image data, wherein the first processor may be configured to divide the 3D image data into data groups which are independent form one another and calculate, from at least one of the data groups, hologram values to be displayed at respective positions on a hologram plane, wherein the second processor may be configured to calculate, from at least another one of the data groups, hologram values to be displayed at the respective positions on the hologram plane, in parallel with the first processor; wherein the first processor and/or the second processor may be further configured to sum the hologram values calculated by the first processor and the second processor, for each of the respective positions on the hologram plane; and wherein the first processor may be further configured to convert the summed hologram values to data for a spatial light modulator.

The controller may be configured as a central processing unit or graphics processing unit including a plurality of processor cores.

The first processor may be further configured to divide the 3D image data into the data groups based on primary color components of a color model set for the first processor.

The primary color components may correspond to red, green, and blue color components.

The first processor may be further configured to divide each of the data groups into a plurality of depth images based on depth information obtained from the hologram plane.

The controller may include 3N processor cores, and N is a number of the plurality of depth images.

The controller may include N processor cores, and N is a number of the plurality of depth images.

With respect to each of plane images of the 3D data image defined by the primary color components and the depth information, the first processor may be further configured to calculate a diffraction limit, divide each of the plane images into a plurality of divided images, each of the plurality of divided image having a size equal to the diffraction limit×the diffraction limit, and form a plurality of sub-images by gathering image data at a same matrix position from each of the plurality of divided images.

According to an aspect of another exemplary embodiment, there is provided a 3D holographic image display apparatus including: a light source; the hologram generating apparatus; and a spatial light modulator, to which the hologram signal formed in the hologram generating apparatus is applied and which modulates light from the light source according to the hologram signal.

BRIEF DESCRIPTION OF THE DRAWINGS

These and/or other aspects will become apparent and more readily appreciated from the following description of exemplary embodiments, taken in conjunction with the accompanying drawings in which:

FIGS. 11A and 11B are conceptual views illustrating that a calculation time is reduced by parallel processing, in which FIG. 11A illustrates a case in which only a layer and a color are distributively processed and FIG. 11B illustrates a case in which a layer, a color, and a diffraction limit are distributively processed altogether;

DETAILED DESCRIPTION

Figure 1:
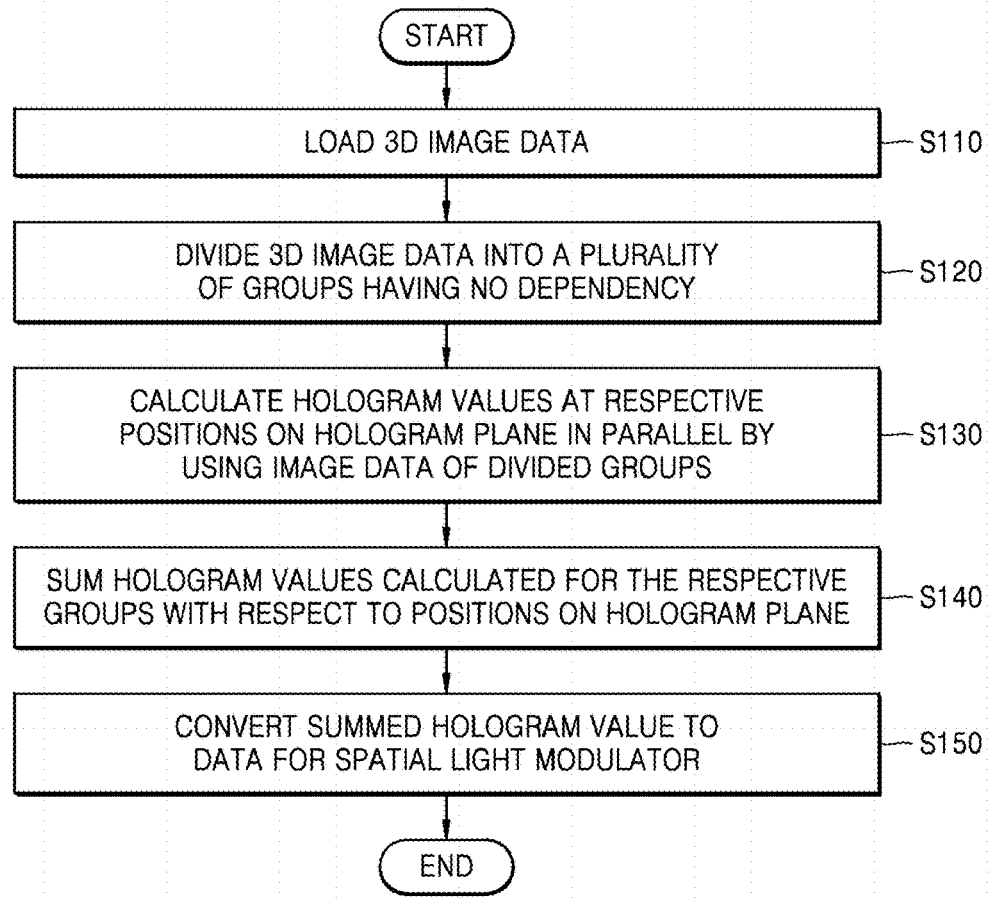
FIG. 1 is a flowchart for schematically explaining a method of generating a hologram according to an exemplary embodiment.

Exemplary embodiments will now be described in detail with reference to the accompanying drawings, wherein like reference numerals refer to like elements throughout. In this regard, the present embodiments may have different forms and should not be construed as being limited to the descriptions set forth herein. Accordingly, the exemplary embodiments are merely described below, by referring to the figures, to explain aspects of the present description. In the drawings, the thicknesses of layers and regions are exaggerated for clarity.

Figure 2:
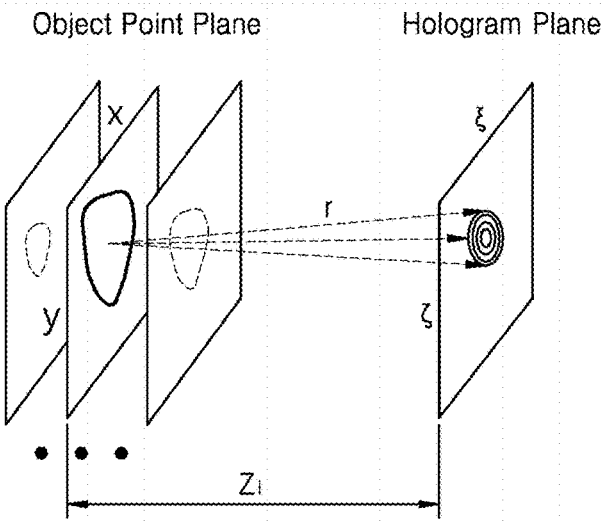
FIG. 2 is a conceptual view for schematically describing a calculation for generating a hologram pattern from an object wave.

FIG. 1 is a flowchart for schematically explaining a method of generating a hologram according to an exemplary embodiment. FIG. 2 is a conceptual view for schematically describing a calculation for generating a hologram pattern from an object wave;

A method of generating a hologram according to the present exemplary embodiment is a method of operating a computer generated hologram, which provides a method of performing a large amount of calculations quickly.

First, as shown in FIG. 2, hologram image information about a three-dimensional (3D) object may be expressed by a hologram value $H(\xi,\zeta)$ on a hologram plane ($\xi$-$\zeta$ plane). The hologram value is a value corresponding to an interference pattern by interference between an object wave and a reference wave. A wave on the hologram plane is presented as a superposition of the object wave and the reference wave, and a magnitude of the wave is expressed as follows.

$$|O+R|^2 = |O|^2 + |R|^2 + O^*R + R^*O \qquad (1)$$

In Equation 1, a value corresponding to $O^*R + R^*O$ is a hologram value H that contains information about the interference pattern by the superposition of the object wave and the reference wave.

The hologram value may be obtained by the Rayleigh-Sommerfeld (R-S) integral.

As illustrated in FIG. 2, object points constituting a 3D object may be divided into object points on each of a plurality of layers having different distances from the hologram plane. The hologram value $H(\xi,\zeta)$ by the object points placed on an $i^{th}$ layer is calculated as follows.

$$H_i(\xi, \zeta) = \iint_{x,y} O(x, y) \frac{z_i}{r^2} e^{j\frac{2\pi r}{\lambda}} dx dy \qquad (2)$$

$$r = \sqrt{(x-\xi)^2 + (y-\zeta)^2 + z_i^2}$$

In Equation 2, $z_i$ is a distance from the $i^{th}$ layer to the hologram plane. An integrand denotes interference between an object wave by an object point $O(x,y)$ on the $i^{th}$ layer and a reference wave. $\lambda$ denotes a wavelength of a reference wave.

The above calculation is repeated by a resulting number of a multiplication of the number of pixels, the number of primary colors of the RGB model, 3, and the number of layers to be embodied on the hologram plane. Also, in the case of embodying a motion picture, the above calculation is repeated by a resulting number of a multiplication of the above three factors—the number of pixels, the number of primary colors, and the number of layers—and the number of frames. Since sequentially repeating the calculation takes a large amount of time, there is a need for a parallel processing process to reduce processing time.

FIG. 1 illustrates a method of generating a hologram according to an exemplary embodiment. As shown in FIG. 1, three-dimensional (3D) image data is loaded (S110).

Next, the 3D image data is divided into a plurality of groups having no dependency with each other (S120).

Hologram values at respective positions on a hologram plane are calculated in parallel by using image data of the divided groups (S130). The calculations using the image data of the respective groups may be performed in a plurality of processors. For example, the above calculations may be performed by a central processing unit (CPU) or a graphics processing unit (GPU) including a plurality of process cores. In other words, the calculations may be simultaneously performed by a plurality of processors.

Next, the calculated hologram values for the respective groups are summed with respect to the positions on the hologram plane (S140). When the hologram values are calculated using the divided image data, wave superposition that occurs at some object points is processed. A hologram pattern from wave superposition by all object points may be obtained by superposing the values calculated for the respective groups.

The hologram pattern obtained as above, in other words, the hologram value at the respective positions on the hologram plane, is converted to data for a spatial light modulator (S150). For example, the hologram value may be converted to an electric signal to form the calculated hologram pattern at the respective positions of the spatial light modulator.

Figure 3:
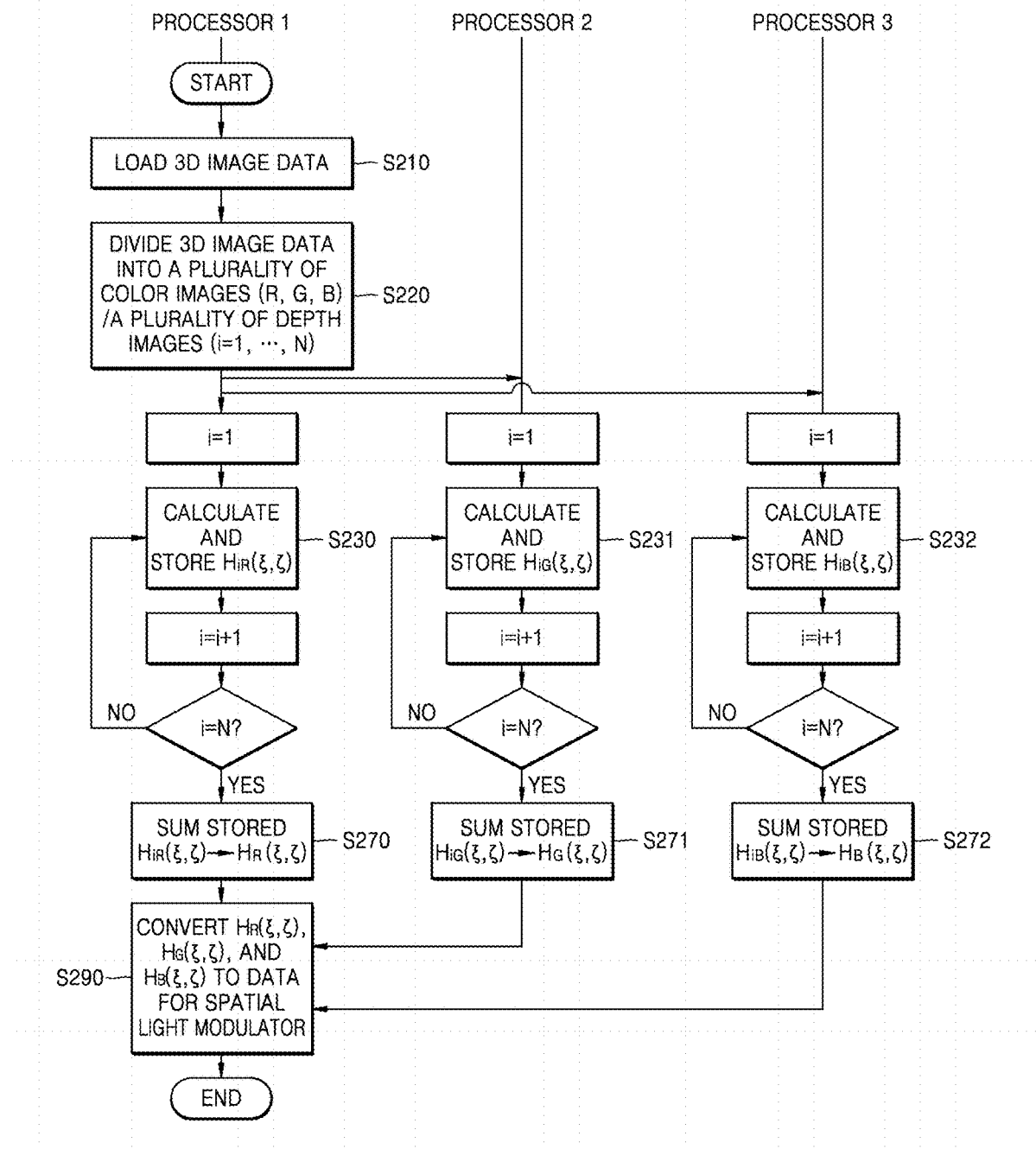
FIG. 3 is a flowchart for schematically explaining a method of generating a hologram according to another exemplary embodiment.
Figure 4:
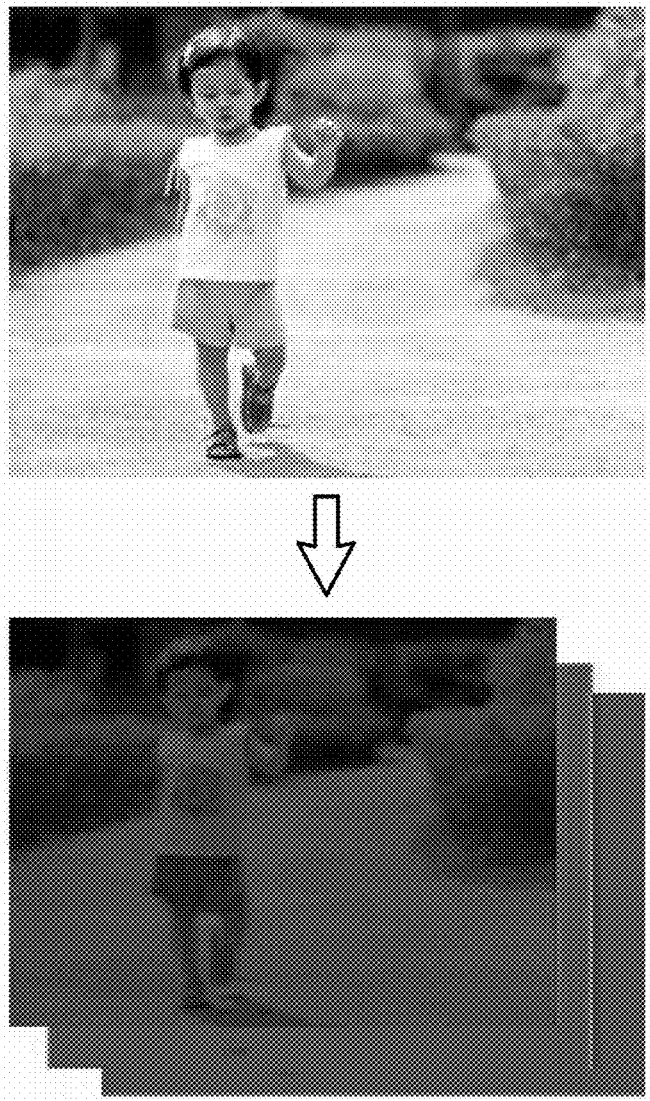
FIG. 4 illustrates the separation of 3D image data into a plurality of pieces of color image data that are independent of one another.
Figure 5:
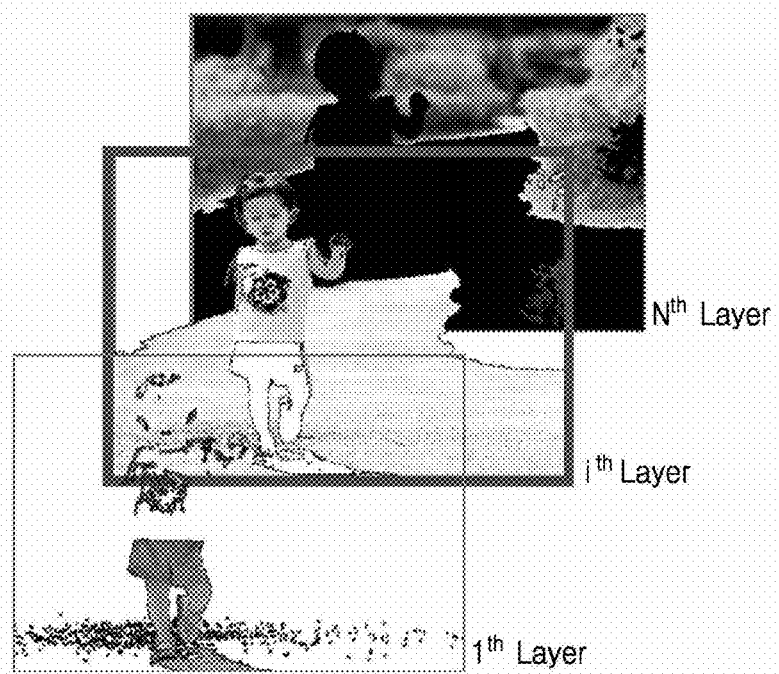
FIG. 5 illustrates the separation of a piece of color image data into a plurality of depth images according to a depth position.

FIG. 3 is a flowchart for schematically explaining a method of generating a hologram according to another exemplary embodiment. FIG. 4 illustrates that 3D image data is separated into a plurality of pieces of color image data that are independent of one another. FIG. 5 illustrates that a piece of color image data is separated into a plurality of depth images according to a depth position.

As shown in FIG. 3, processor 1 loads 3D image data (S210), and divides the 3D image data based on a color and a depth (S220).

The 3D image data may be divided into Red (R), Green (G), and Blue (B) images according to a color component, as illustrated in FIG. 4. Also, as illustrated in FIG. 5, the color image data may be divided into a plurality of depth images according to depth information, for example, into N layers.

In the method of generating a hologram according to the present exemplary embodiment, image processing is performed in parallel by three processors, process 1, process 2, and process 3, and the calculation of the hologram value is performed according to color components.

Processor 1 calculates $H_{iR}(\xi,\zeta)$ with respect to a color component R and stores the calculated value (S230). After repeatedly performing the calculation from i=1 to N, processor 1 sums the calculated values (S270).

$$H_R(\xi, \zeta) = \sum_{i=1}^{N} H_{iR}(\xi, \zeta) \qquad (3)$$

Processor 2 calculates $H_{iG}(\xi,\zeta)$ with respect to a color component G and stores the calculated value (S231). After repeatedly performing the calculation from i=1 to N, processor 2 sums the calculated values (S271).

$$H_G(\xi, \zeta) = \sum_{i=1}^{N} H_{iG}(\xi, \zeta) \qquad (4)$$

Processor 3 calculates $H_{iB}(\xi,\zeta)$ with respect to a color component B and stores the calculated value (S232). After repeatedly performing the calculation from i=1 to N, the processor 3 sums the calculated values (S272).

$$H_B(\xi, \zeta) = \sum_{i=1}^{N} H_{iB}(\xi, \zeta) \qquad (5)$$

The exemplary process in which in the processors respectively calculate $H_{iR}(\xi,\zeta)$, $H_{iG}(\xi,\zeta)$, and $H_{iB}(\xi,\zeta)$ is described hereinafter with reference to FIG. 8.

$H_R(\xi,\zeta)$, $H_G(\xi,\zeta)$, and $H_B(\xi,\zeta)$ are information about interference patterns between an object wave and a reference wave, and contain information about the 3D image for each of the three color components, R, G, and B.

Next, $H_R(\xi,\zeta)$, $H_G(\xi,\zeta)$, and $H_B(\xi,\zeta)$ are converted to data for a spatial light modulator (S290). For example, $H_R(\xi,\zeta)$, $H_G(\xi,\zeta)$, and $H_B(\xi,\zeta)$ may be converted to electric signals such that the above-calculated hologram pattern on the hologram plane is formed on the spatial light modulator. Then, when the spatial light modulator is irradiated with the reference wave, a 3D image contained in the hologram pattern is reproduced.

In the above description, although processes such as the loading of the 3D image data, the dividing of the 3D image data, the superposition with the hologram values calculated by other processors, and the converting to data for a spatial light modulator are described as being performed by the processor 1, this is exemplary and any one of the processors 1, 2, and 3, or another processor may perform the processes.

FIG. 3 illustrates that the 3D image data is divided into red, green, and blue images based on the RGB color model, but not limited thereto. The 3D image data may be divided into primary color images of any color model. For example, the 3D image data may be divided into cyan, magenta, yellow, and key (black) images based on the CMYK color model.

Figure 6:
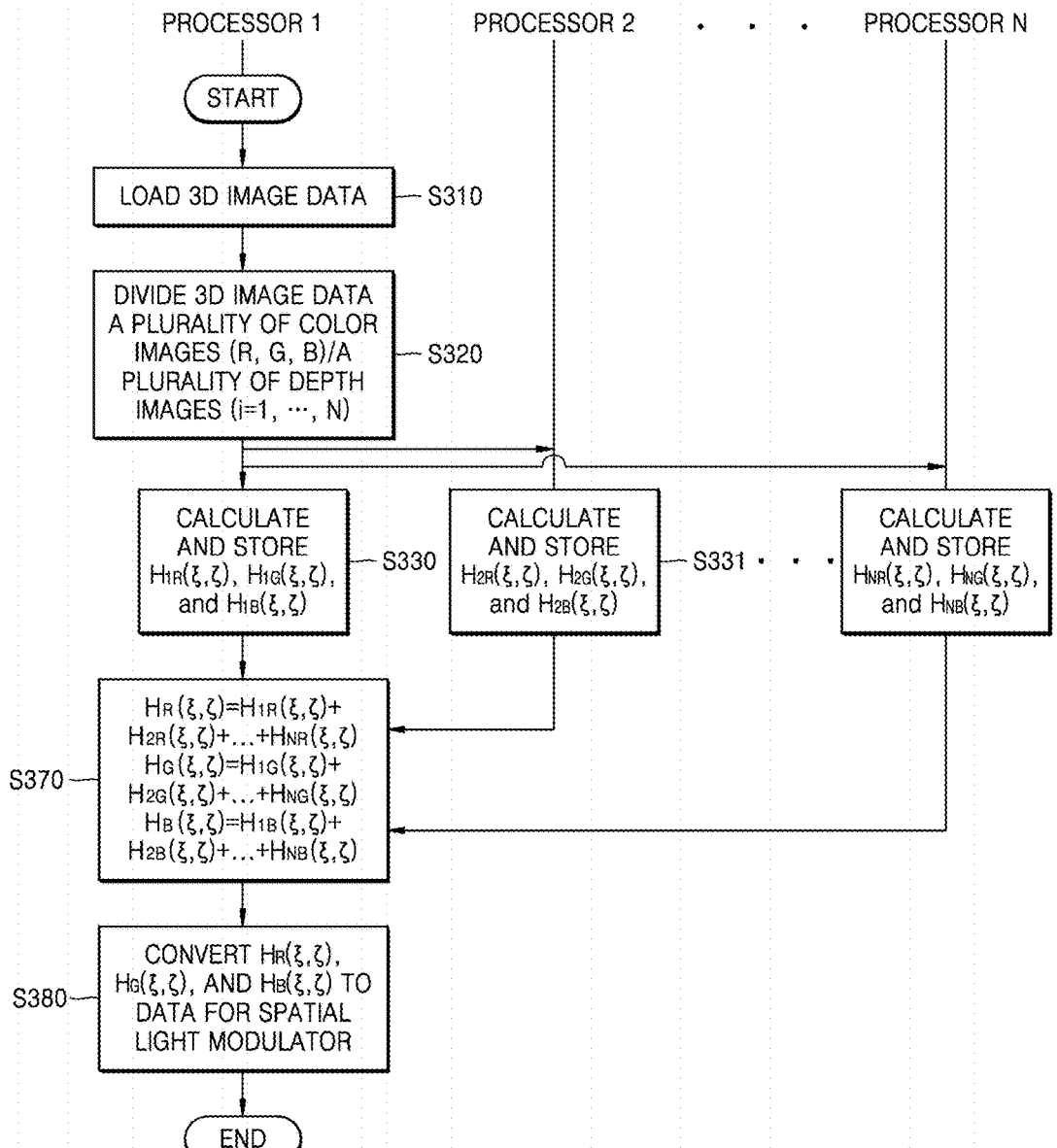
FIG. 6 is a flowchart for schematically explaining a method of generating a hologram according to another exemplary embodiment.

FIG. 6 is a flowchart for schematically explaining a method of generating a hologram according to another exemplary embodiment.

As shown in FIG. 6, processor 1 loads 3D image data (S310), and divides the 3D image data based on a color depth (S320).

These processes are substantially the same as those described with reference to FIGS. 4 and 5.

In the method of generating a hologram according to the present exemplary embodiment, a parallel processing process in N-number of processors corresponding to the number of layers is described as an example, in other words, the calculation of a hologram value is performed separately according to the depth information.

Processor 1 calculates $H_{1R}(\xi,\zeta)$ with respect to a color component R, $H_{1G}(\xi,\zeta)$ with respect to a color component G, and $H_{1B}(\xi,\zeta)$ with respect to a color component B, for a first layer, and stores the calculated values (S330).

Processor 2 calculates $H_{2R}(\xi,\zeta)$ with respect to the color component R, $H_{2G}(\xi,\zeta)$ with respect to the color component G, and $H_{2B}(\xi,\zeta)$ with respect to the color component B, for a second layer, and stores the calculated values (S331). Likewise, processor N calculates $H_{NR}(\xi,\zeta)$ with respect to the color component R, $H_{NG}(\xi,\zeta)$ with respect to the color component G, and $H_{NB}(\xi,\zeta)$ with respect to the color component B, for a $n^{th}$ layer, and stores the calculated values.

An exemplary process of calculating $H_{iR}(\xi,\zeta)$, $H_{iG}(\xi,\zeta)$, and $H_{iB}(\xi,\zeta)$ (i=1, ..., N) in the respective processors is described with reference to FIG. 8.

Next, $H_R(\xi,\zeta)$, $H_G(\xi,\zeta)$, and $H_B(\xi,\zeta)$ are obtained by summing information about all layers for each color by using $H_{iR}(\xi,\zeta)$, $H_{iG}(\xi,\zeta)$ and $H_{iB}(\xi,\zeta)$ (i=1, ..., N) which are respectively calculated in the processor 1 to the processor N (S370).

$$H_R(\xi, \zeta) = \sum_{i=1}^{N} H_{iR}(\xi, \zeta)$$

$$H_G(\xi, \zeta) = \sum_{i=1}^{N} H_{iG}(\xi, \zeta)$$

$$H_B(\xi, \zeta) = \sum_{i=1}^{N} H_{iB}(\xi, \zeta)$$

$H_R(\xi,\zeta)$, $H_G(\xi,\zeta)$, and $H_B(\xi,\zeta)$ are information about the interference pattern between an object wave and a reference wave and contain information about a 3D image for each color.

Next, $H_R(\xi,\zeta)$, $H_G(\xi,\zeta)$, and $H_B(\xi,\zeta)$ are converted to data for a spatial light modulator (S380). For example, $H_R(\xi,\zeta)$, $H_G(\xi,\zeta)$, and $H_B(\xi,\zeta)$ may be converted to electric signals such that the above-calculated hologram pattern on the hologram plane is formed on the spatial light modulator. Then, when the reference wave is irradiated onto the spatial light modulator, a 3D image contained in the hologram pattern is reproduced.

Although in the above description such processes as the loading of the 3D image data, the dividing of the 3D image data, the superposition with the hologram values calculated by other processors, and the converting to the data for a spatial light modulator are described to be performed by the processor 1, this is exemplary and any one of the processors 1 to N, or other processor may perform the processes.

Figure 7:
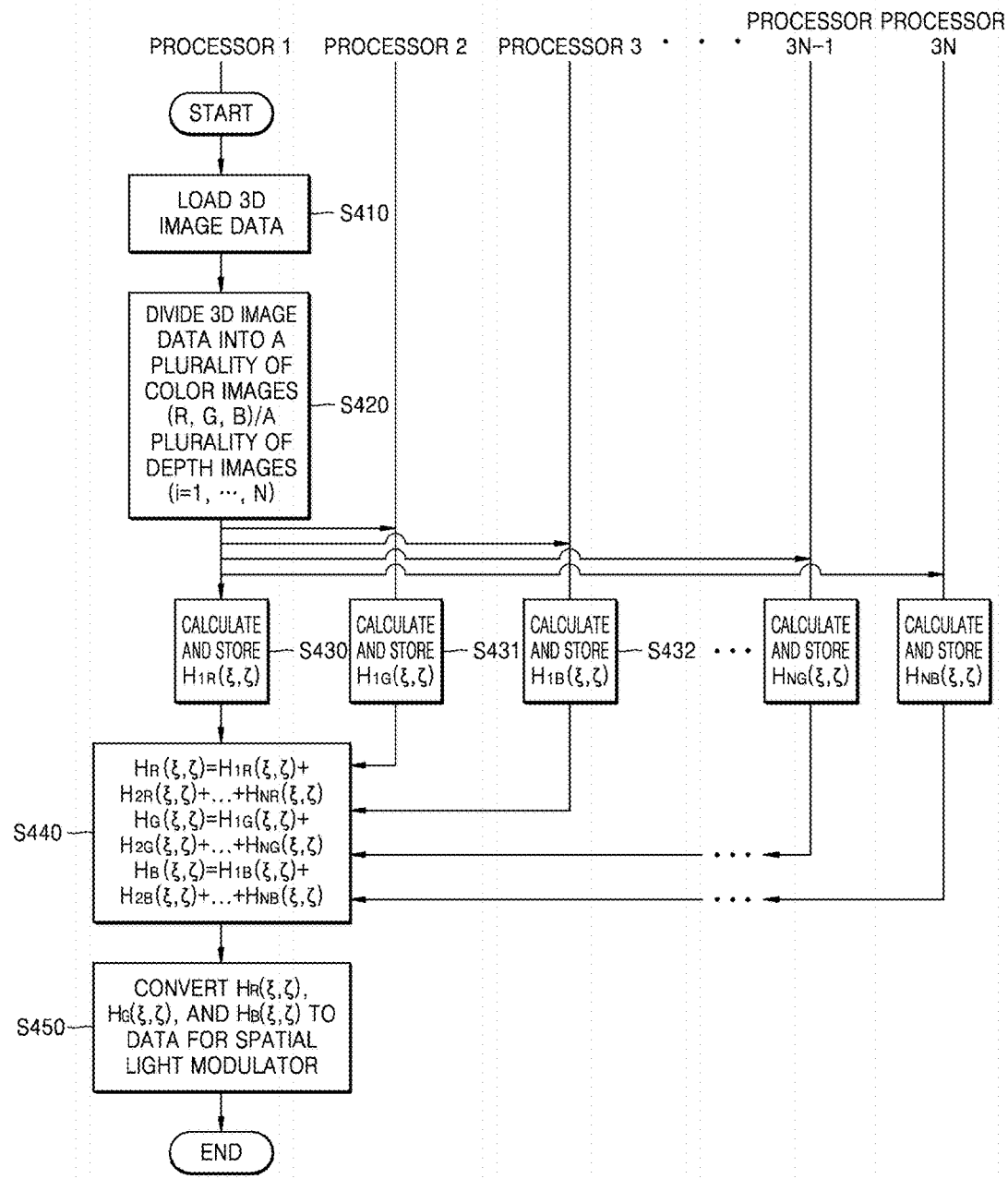
FIG. 7 is a flowchart for schematically explaining a method of generating a hologram according to another exemplary embodiment.

FIG. 7 is a flowchart for schematically explaining a method of generating a hologram according to another exemplary embodiment.

As shown in FIG. 7, processor 1 loads 3D image data (S410), and divides the 3D image data based on a color depth (S420).

These processes are substantially the same as those described with reference to FIGS. 4 and 5.

In the method of generating a hologram according to the present exemplary embodiment, a parallel processing process in 3N-number of processors corresponding to the number of combinations of colors and layers is described as an example, in other words, the calculation of a hologram value is performed separately by dividing image data into a plurality of groups according to a combination of colors and depth information.

Processor 1 calculates $H_{1R}(\xi,\zeta)$ with respect to a color component R and a first layer and stores the calculated value (S430). Processor 2 calculates $H_{1G}(\xi,\zeta)$ with respect to a color component G and the first layer and stores the calculated value (S431). Processor 3 calculates $H_{1B}(\xi,\zeta)$ with respect to a color component B and the first layer and stores the calculated value (S432). Processor 3N-1 calculates $H_{NG}(\xi,\zeta)$ with respect to the color component G and a $n^{th}$ layer and stores the calculated value and processor 3N calculates $H_{NB}(\xi,\zeta)$ with respect to the color component B and the $n^{th}$ layer, and stores the calculated value.

A process of calculating $H_{iR}(\xi,\zeta)$, $H_{iG}(\xi,\zeta)$, and $H_{iB}(\xi,\zeta)$ (i=1, ..., N) in the respective processors is described hereinafter with reference to FIG. 8.

Next, $H_R(\xi,\zeta)$, $H_G(\xi,\zeta)$, and $H_B(\xi,\zeta)$ are obtained by summing information over all layers for each color by using $H_{iR}(\xi,\zeta)$, $H_{iG}(\xi,\zeta)$, and $H_{iB}(\xi,\zeta)$ (i=1, ..., N) which are respectively calculated in the processor 1 to the processor 3N (S440).

$$H_R(\xi, \zeta) = \sum_{i=1}^{N} H_{iR}(\xi, \zeta)$$

$$H_G(\xi, \zeta) = \sum_{i=1}^{N} H_{iG}(\xi, \zeta)$$

$$H_B(\xi, \zeta) = \sum_{i=1}^{N} H_{iB}(\xi, \zeta)$$

$H_R(\xi,\zeta)$, $H_G(\xi,\zeta)$, and $H_B(\xi,\zeta)$ are information about the interference pattern between an object wave and a reference wave and contain information about a 3D image for each color.

Next, $H_R(\xi,\zeta)$, $H_G(\xi,\zeta)$, and $H_B(\xi,\zeta)$ are converted to data for a spatial light modulator S450. For example, $H_R(\xi,\zeta)$, $H_G(\xi,\zeta)$, and $H_B(\xi,\zeta)$ may be converted to electric signals such that the above-calculated hologram pattern on the hologram plane is formed on the spatial light modulator. Then, when the reference wave is irradiated onto the spatial light modulator, a 3D image contained in the hologram pattern is reproduced.

Although in the above description such processes as the loading of the 3D image data, the dividing of the 3D image data, the superposition with the hologram values calculated by other processors, and the converting to the data for a spatial light modulator are described to be performed by the processor 1, this is exemplary and any one of processors 1 to 3N, or other processor may perform the processes.

Although in the above-described exemplary embodiments the number of processors is indicated to be 3, N, and 3N, the present inventive concept is not limited thereto and may be modified to have the above processes performed in two or more processors.

Figure 8:
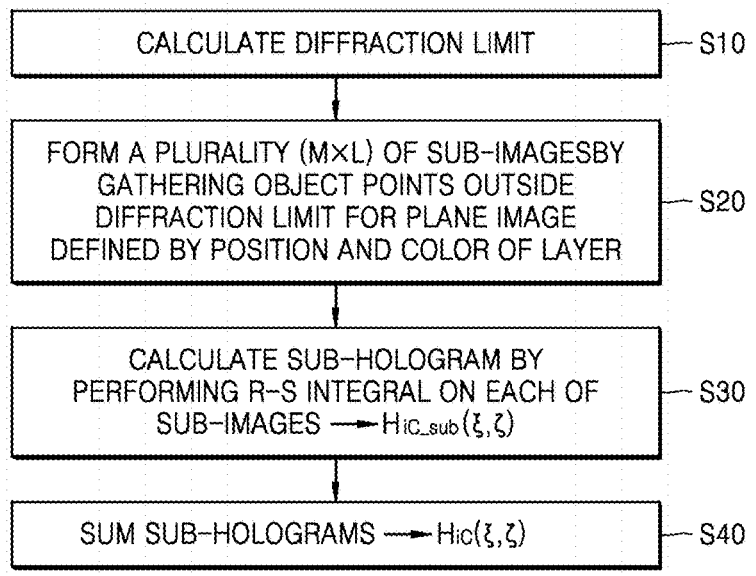
FIG. 8 is a flowchart for schematically explaining a detailed process of calculating a hologram value, which may be used in the flowcharts of FIGS. 3, 6, and 7.

FIG. 8 is a flowchart for schematically explaining a detailed process of calculating a hologram value, which may be used in the flowcharts of FIGS. 3, 6, and 7. FIGS. 9A to 9E are views illustrating a detailed process of the flowchart of FIG. 8.

First, a diffraction limit for the Rayleigh-Sommerfeld (R-S) integral is calculated (S510). The calculation of a diffraction limit is to perform integral with only components among object points that actually constitute the hologram value, in the calculation of Equation (2). An amount of energy of an object wave by object points at particular positions arriving at other particular positions on the hologram plane may be decreased to be ignorable due to the diffraction limit.

The diffraction limit $d_{limit}$ may be calculated as follows.

$$d_{limit} = \frac{\lambda z}{p}$$

In the above equation, $\lambda$ denotes a wavelength of a reference wave, z denotes a distance from a layer where an object point is placed to a hologram plane, and p denotes a pixel pitch.

Figure 9A:
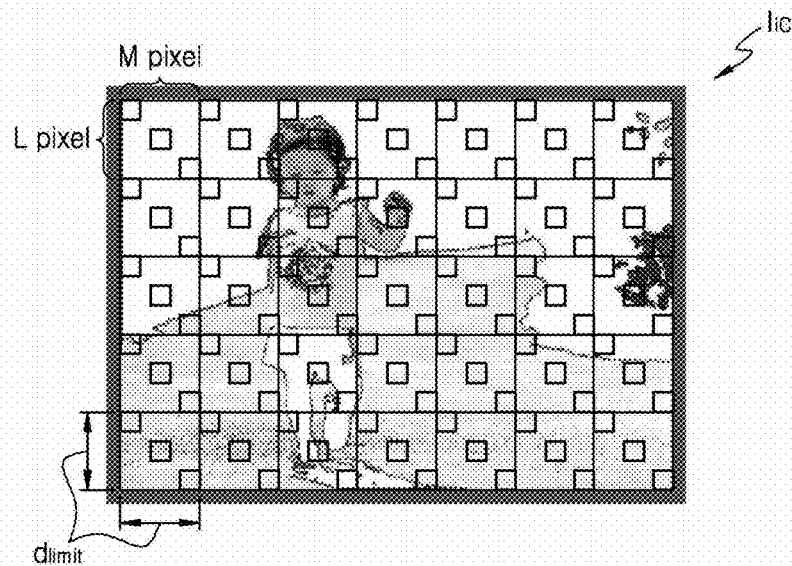
FIGS. 9A to 9E are views illustrating a detailed process of the flowchart of FIG. 8.

FIG. 9A illustrates that a plane image $I_{iC}$ defined by a layer position i and a color C is divided into a plurality of sub-images, each having a size equal to $d_{limit} \times d_{limit}$. Each sub-image may include M×L number of pixels.

Next, for the plane image defined by the layer position and the color, a plurality (M×L) of sub-images are formed by gathering object points outside the diffraction limit S20.

This process is described with reference to FIGS. 9B to 9D.

Figure 9B:
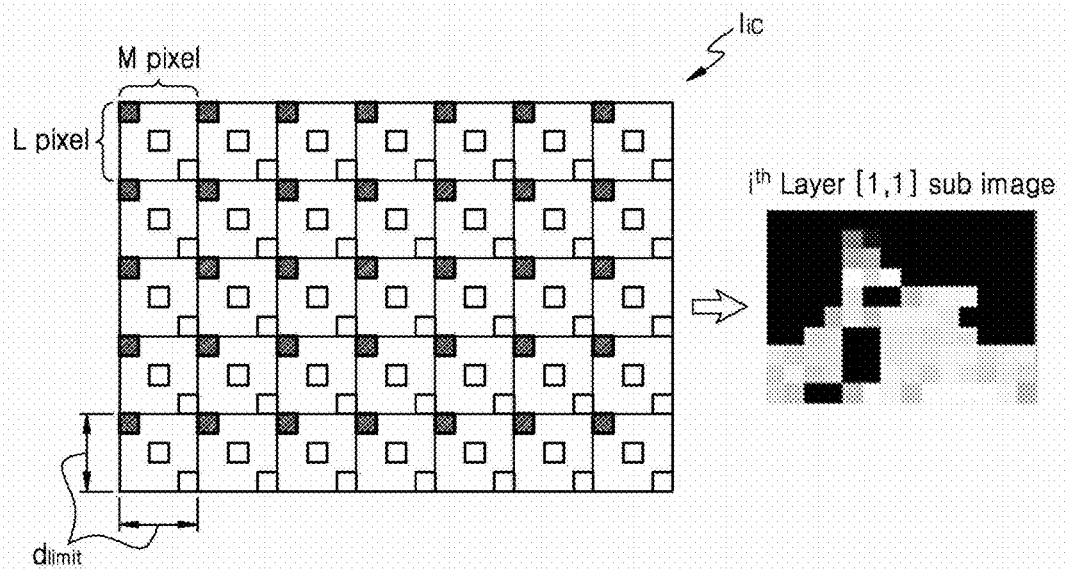

As shown in FIG. 9B, a sub-image [1,1] is formed by gathering object points corresponding to a position [1,1] in each of the divided images.

Figure 9C:
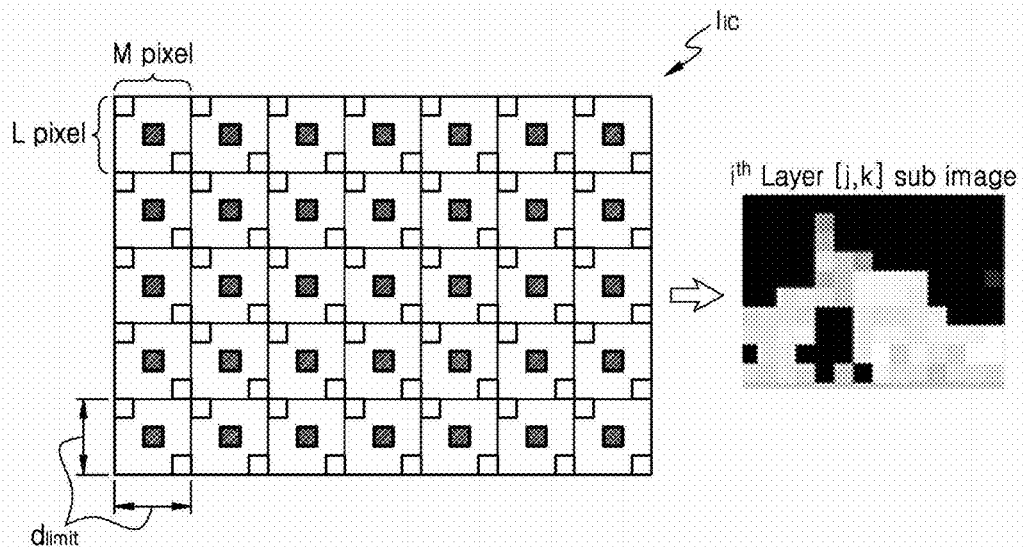

As shown in FIG. 9C, a sub-image [i,j] is formed by gathering object points corresponding to a position [i,j] in each of the divided images.

Figure 9D:
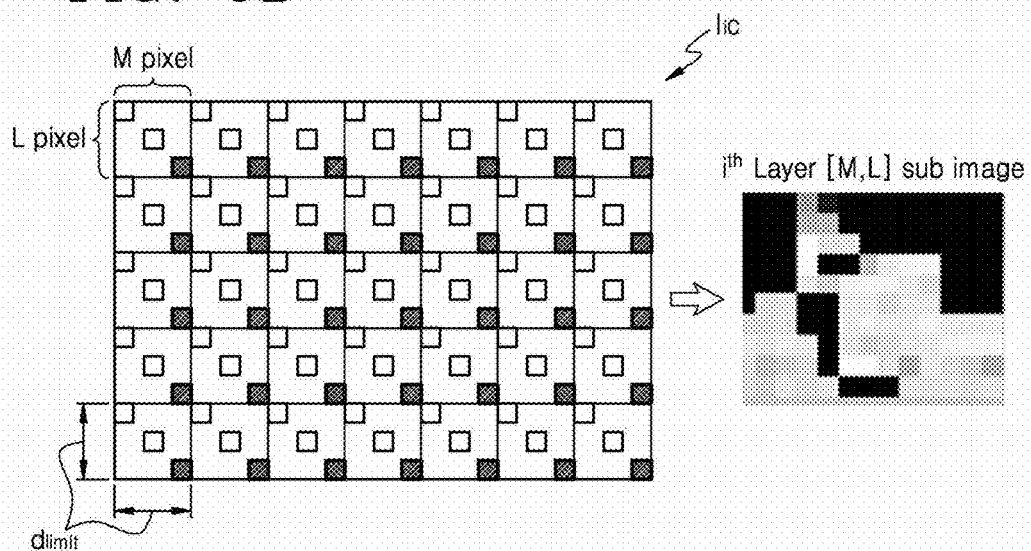

As shown in FIG. 9D, a sub-image [M,L] is formed by gathering object points corresponding to a position [M,L] in each of the divided images.

A plurality (M×L) of sub-images are formed in the above method.

Next, a sub-hologram $H_{iC\_sub}(\xi,\zeta)$ is calculated by performing the R-S integral on each of the sub-images (S30).

Figure 9E:
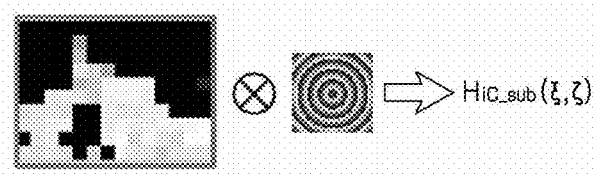

FIG. 9E conceptually illustrates the R-S integral for calculating the sub-hologram $H_{iC\_sub}(\xi,\zeta)$.

Next, the hologram value $H_{iC}(\xi,\zeta)$ for the plane image $I_{iC}$ defined by the layer position i and color C is produced by summing the sub-holograms.

$H_{iR}(\xi,\zeta)$, $H_{iG}(\xi,\zeta)$ and $H_{iB}(\xi,\zeta)$ to be used in the flowcharts of FIGS. 3, 6, and 7 may be obtained as follows.

$$H_{iR}(\xi,\zeta) = \sum_{sub} H_{iR\_sub}(\xi,\zeta)$$

$$H_{iG}(\xi,\zeta) = \sum_{sub} H_{iG\_sub}(\xi,\zeta)$$

$$H_{iB}(\xi,\zeta) = \sum_{sub} H_{iB\_sub}(\xi,\zeta)$$

Although in the above description the R-S integral method is used for the calculation of a hologram, this is exemplary and a Fresnel transformation method using fast Fourier transformation (FFT), an angular spectrum method, or a method including mathematical modifications of the above methods may be used therefor.

Also, a method using a look-up table for using a previously calculated result may be used. The look-up table method may be used with the above calculation method. According to the look-up table method, hologram values of object points are calculated and stored in a look-up table. When a hologram value of the same object point is needed, a value stored in the look-up table is used without performing the same calculation. However, this is exemplary and the present inventive concept is limited thereto.

Figure 10:
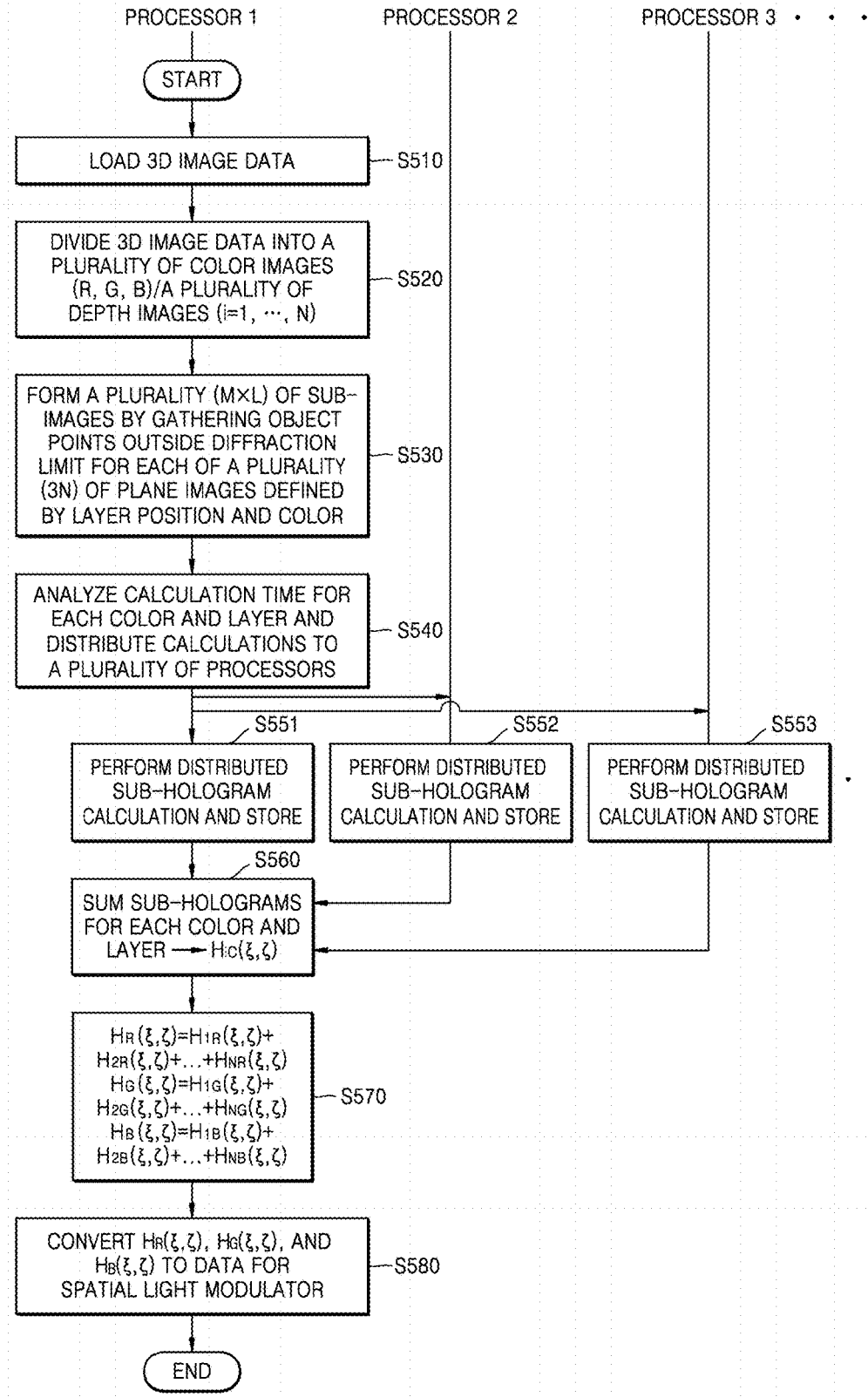
FIG. 10 is a flowchart for schematically explaining a method of generating a hologram according to another exemplary embodiment.
Figure 11A:
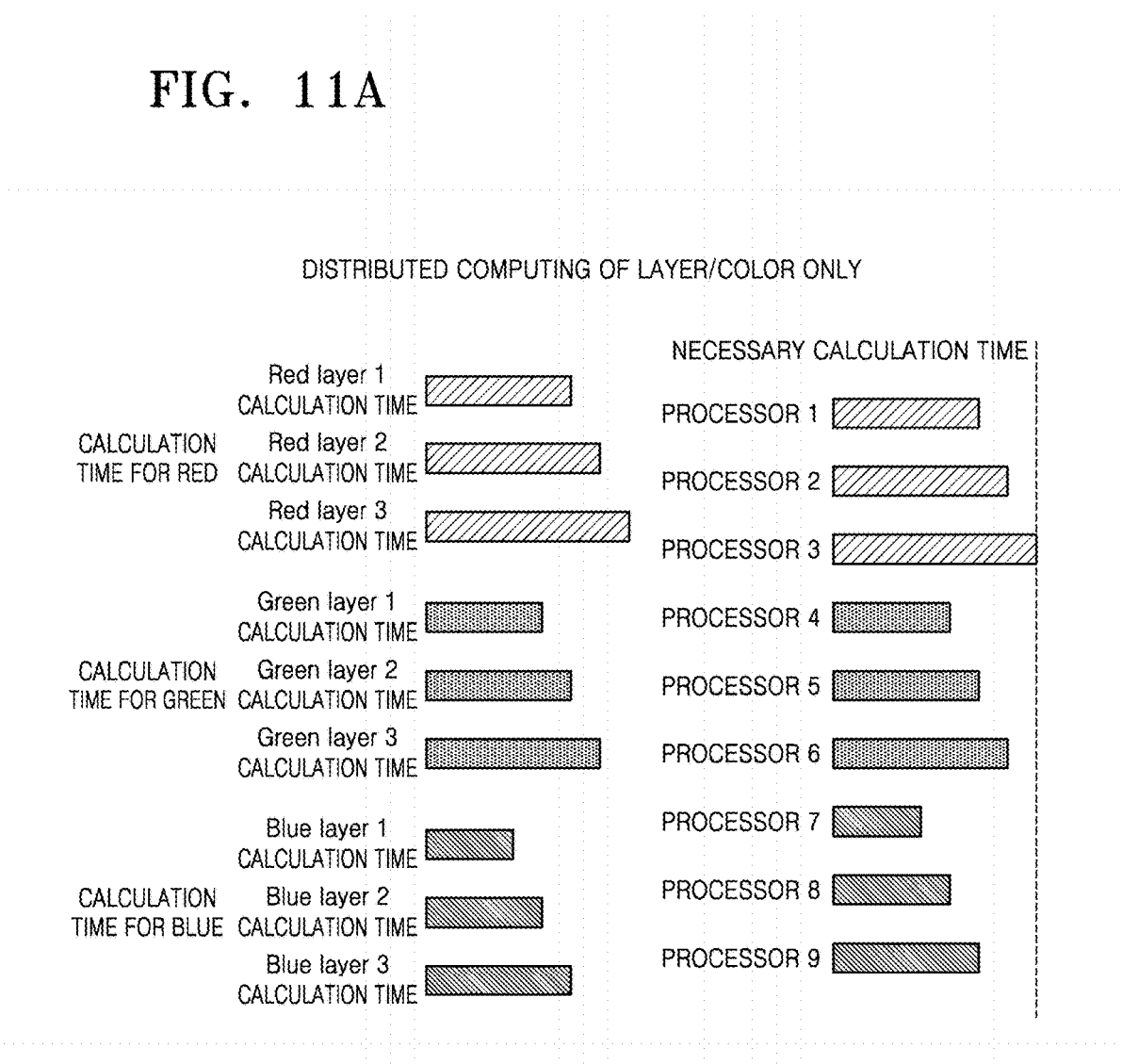
Figure 11B:
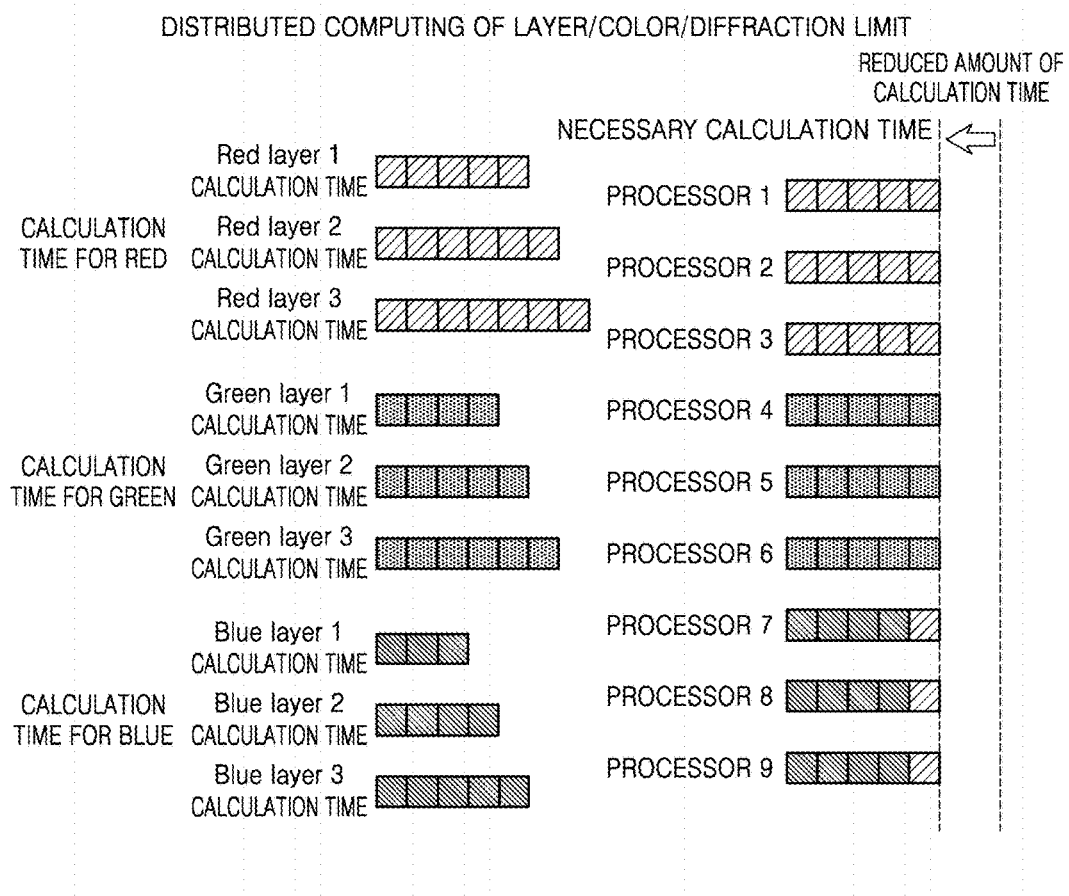

FIG. 10 is a flowchart for schematically explaining a method of generating a hologram according to another exemplary embodiment. FIGS. 11A and 11B are conceptual views illustrating that a calculation time is reduced by a parallel processing process, in which FIG. 11A illustrates a case in which only a layer and a color are distributively processed and FIG. 11B illustrate a case in which a layer, a color, and a diffraction limit are distributively processed altogether.

While in the flowcharts of FIGS. 3, 5, and 7 the hologram calculation is parallelly performed only on a color and a layer, in the present exemplary embodiment, the hologram calculation is parallelly performed on a color, a layer, and a diffraction limit.

As shown in FIG. 10, processor 1 loads 3D image data (S510), and divides the 3D image data based on a color depth (S520). The 3D image data may be divided into R, G, and B images according to a color component as illustrated in FIG. 4. Also, as illustrated in FIG. 5, the 3D image data may be divided into a plurality of depth images according to the depth information, for example, N-number of layers.

Next, processor 1 generates a plurality (M×L) of sub-images are formed by gathering object points outside the diffraction limit for each of a plurality (3N) of plane images $I_{iC}$ defined by the layer position and the color (S530). This process is the same as that described with reference to FIGS. 9A to 9D.

Next, processor 1 analyzes a calculation time for each color and layer and distributes a result of the calculation to a plurality of processors, including processor 2 and processor 3 (S540). Each processor performs a distributed sub-hologram calculation and stores a result thereof (S552 and S553).

In the above-described exemplary embodiments, for example, (3N×M×L)-number of processes are equally calculated by a plurality of processors without analyzing the calculation time for each color. In this case, the amount of image data for each color may vary for each layer and thus the calculation time may vary according thereto. In other words, of the processors, the calculation may be quick in some processors and may be relatively long in other processors.

Referring to FIG. 11A, for example, a calculation time for a blue color of a first layer may be shortest and a calculation time for a red color of a third layer may be the longest. Accordingly, even when the calculations of other processors are finished, a next process does not take place until the calculation in processor 3 is finished. However, if processor 7 that finished a process early takes over the process of processor 3, the next process may take place rather soon.

Referring to FIG. 11B, distributing work to the respective processors is performed after analyzing a calculation time for each color and layer. Accordingly, the calculation in all processors are completed at the same time and the calculation time is reduced compared to the case illustrated in FIG. 11A.

Referring back to FIG. 10, sub-hologram values calculated in a plurality of processors are summed for each color and layer and thus $H_{iC}(\xi,\zeta)$ (i=1, 2, ... N, C=R, G, B) is obtained (S570).

Next, $H_{iC}(\xi,\zeta)$ (i=1, 2, ... N, C=R, G, B) for each color is summed over all layers, thereby $H_R(\xi,\zeta)$, $H_G(\xi,\zeta)$, and $H_B(\xi,\zeta)$ are obtained (S570).

Next, $H_R(\xi,\zeta)$, $H_G(\xi,\zeta)$, and $H_B(\xi,\zeta)$ are converted to data for a spatial light modulator (S580).

Although in the above description such processes as the loading of the 3D image data, the dividing of the 3D image data, the analyzing of the calculation time and distributing of work to other processors, and the converting to the data for a spatial light modulator are described to be performed by processor 1, this is exemplary and other processor may perform the processes.

Figure 12:
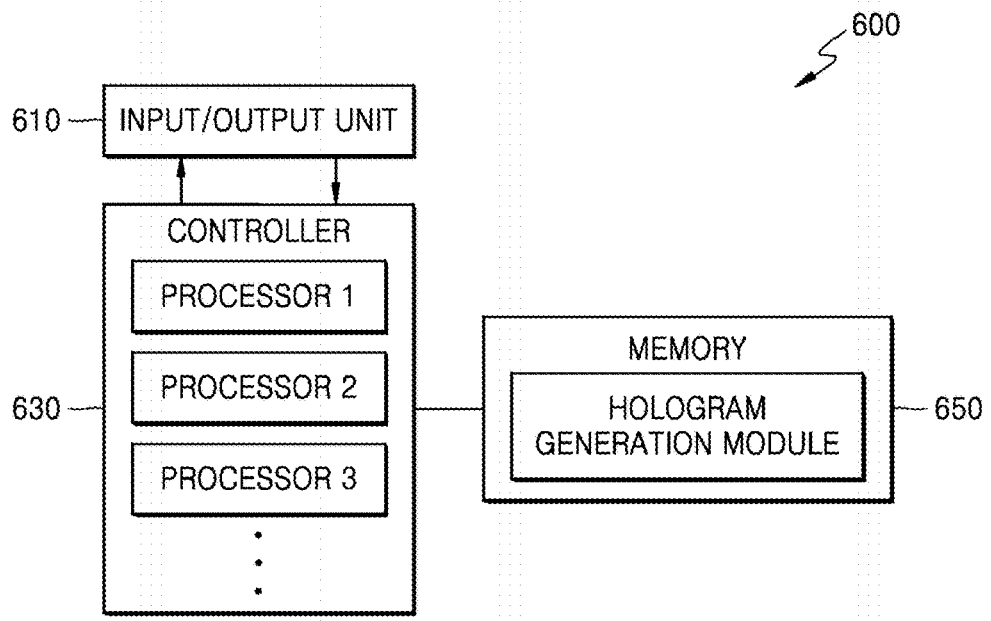
FIG. 12 is a block diagram illustrating a schematic structure of a hologram generation apparatus according to an exemplary embodiment.

FIG. 12 is a block diagram illustrating a schematic structure of a hologram generation apparatus 600 according to an exemplary embodiment.

The hologram generation apparatus 600 may include a memory 650 storing at least one program and a controller 630 having a plurality of processors for executing the program to form hologram signals to be reproduced as 3D image data.

The memory 650 stores a program about a hologram generation module. The hologram generation module may include commands that perform the above-described hologram generation method. For example, the hologram generation module may include commands that perform receiving 3D image data information; dividing the 3D image data into a plurality of groups having no dependency with each other; and calculating a hologram value to be displayed at each position on a hologram plane from the image data divided into the groups, which includes parallelly performing calculations on the groups; summing the hologram values calculated in the groups with respect to each position on the hologram plane; and converting the summed hologram value to data for a spatial light modulator. The hologram generation module may further include commands for the above-described processes.

The controller 630 may include a plurality of processors and may be formed of, for example, a CPU or GPU having a plurality of processor cores. The controller 630 performs the program that is the hologram generation module stored in the memory 650. In other words, the controller 630 performs the loading of 3D image data, dividing the 3D image data into a plurality of groups having no dependency with each other, the calculation of hologram values for the respective groups in a plurality of processors, the superposition of the hologram values, and the converting to electric signals to be applied to a spatial light modulator.

The controller 630 executes program codes to perform the above-described processes with an operating system, and generates and uses data. The operating system is generally well known and may include, for example, Windows based OS, Unix, Linux, Palm OS, DOS, Android, Macintosh, etc.

The controller 630 may be embodied in a single chip, a plurality of chips, or a plurality of electric parts. For example, an exclusive or embedded processor, a single purpose processor, a controller, an application specific integrated circuit (ASIC), etc. including other various architectures may be used for the controller 630.

The hologram generation apparatus 600 may further includes an input/output unit 610 for inputting a command or data to drive the controller 630, in other words, execute a program, and outputting a result of calculation.

In detail, the input/output unit 610 may receive an input of information needed for execution of a hologram generation module program from a user and transmit the received information to the controller 630. The input/output unit 610 may include a button, a keypad, a switch, a dial, or a touch interface, which is used for the user to directly manipulate the controller 630. Also, the input/output unit 610 may include a display that displays images needed for the manipulation of the controller 630, which may be embodied by a touch screen. Also, the input/output unit 610 may include an I/O port for connecting human interface devices (HIDs) or an I/O port for data input/output.

Figure 13:
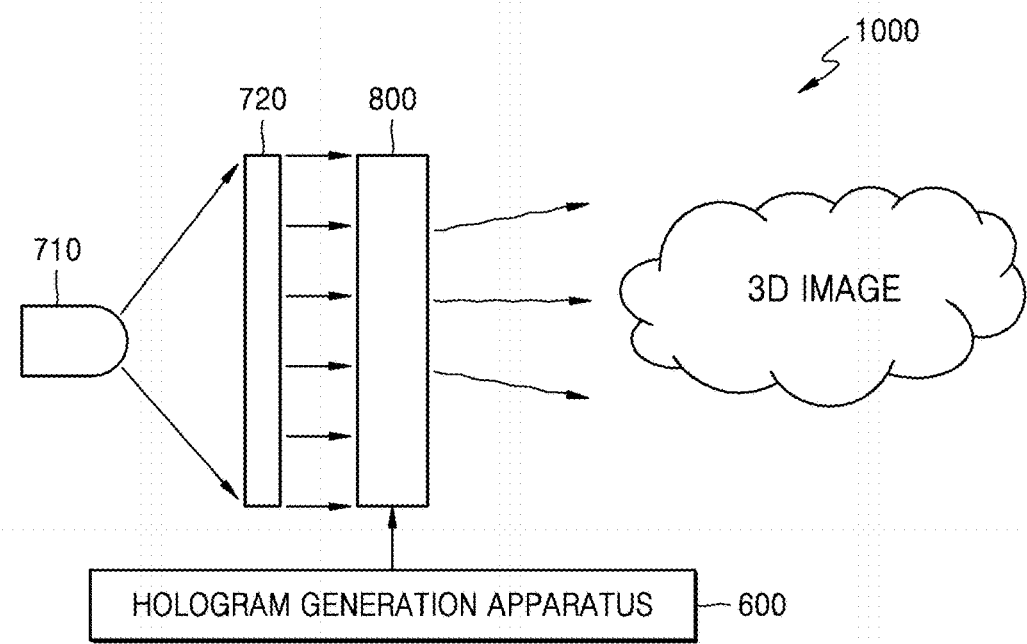
FIG. 13 illustrates a schematic structure of a holographic 3D image display apparatus according to an exemplary embodiment.

FIG. 13 illustrates a schematic structure of a holographic 3D image display apparatus 1000 according to an exemplary embodiment.

The holographic 3D image display apparatus 1000 may include a light source 710, the hologram generation apparatus 600, and a spatial light modulator 800 to which a hologram signal formed in the hologram generation apparatus 600 is applied and which modulates light in the light source 710 according to the hologram signal.

The light source 710 may include a laser, a light-emitting diode (LED), or a laser diode (LD), but the present inventive concept is not limited thereto.

The hologram generation apparatus 600 is the hologram generation apparatus as described with reference to FIG. 12 and calculates 3D image data to be reproduced as hologram values, converts the hologram values to electric signals, and applies the electric signals to the spatial light modulator 800.

The spatial light modulator 800 is a device to spatially modulate light. The spatial light modulator 800 is a device to control the strength, color, and/or phase of an incident light and may be formed in a matrix of a plurality of pixels that are controllable. The pixels reconfigure object points by changing the amplitude and/or phase of light that passes through the pixels. The spatial light modulator 800 may be a transmissive type or a reflective type. Although FIG. 13 illustrates that the spatial light modulator 800 as a transmissive type, the present inventive concept is not limited thereto. A transmissive spatial light modulator includes, for example, a modulator in which liquid crystal cells or electrowetting cells are arranged on a transparent substrate. A reflective spatial light modulator includes, for example, a liquid crystal on silicon (LCOS) device.

When a hologram signal is applied from the hologram generation apparatus 600 to the spatial light modulator 800, the spatial light modulator 800 displays an interference pattern. Then, when the light source 710 irradiates light onto the spatial light modulator 800 where the interference pattern is formed, an object wave forming the interference pattern of the spatial light modulator 800 is reproduced by the light and proceeds and thus the 3D image contained in the object wave is reconstructed to be seen by a user The light irradiated onto the spatial light modulator 800 is the same as the reference wave that is used for calculating a hologram in the hologram generation apparatus 600. To this end, necessary optical members may be further arranged between the light source 710 and the spatial light modulator 800. For example, as illustrated in FIG. 13, a collimator 720 may be arranged between the light source 710 and the spatial light modulator 800. The collimator 720 may include one or more lenses and collimates the light irradiated from the light source 710 to be a parallel light. The collimator 720 may include, for example, a cylinder lens or a cylinder lens array.

Also, optical members for enlarging or reducing an image reproduced in the spatial light modulator 800 or allowing the image to direct in a particular direction may be arranged in front of the spatial light modulator 800.

For example, a field lens for collecting the light from the spatial light modulator 800 toward the eyes of a user. The field lens may be manufactured as a diffractive optical element or a holographic optical element.

The method and apparatus for generating a hologram, and the holographic 3D image display apparatus, according to the present inventive concept may be configured not only by limitedly employing the structures and methods of above-described exemplary embodiments, but also by selectively combining the whole or part of the above-described exemplary embodiments to have a variety of modifications.

The method and apparatus for generating a hologram, and the holographic 3D image display apparatus, according to the present inventive concept may be applied to a variety of electronic apparatuses, for example, monitors, TVs, mobile display devices, or mobile communication devices.

In addition, the method of generating a hologram according to the present inventive concept can also be implemented through computer readable code/instructions in/on a medium, e.g., a computer readable medium, to control at least one processing element to implement any above described exemplary embodiment, which may be read by a processor provided in a hologram generation apparatus. The medium can correspond to any medium/media permitting the storage and/or transmission of the computer readable code. The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more exemplary embodiments of the present inventive concept. The media may also be a distributed network, so that the computer readable code is stored/transferred and executed in a distributed fashion. Furthermore, the processing element could include a processor or a computer processor, and processing elements may be distributed and/or included in a single device.

According to the method and apparatus for generating a hologram according to the present inventive concept, since 3D image data is divided into a plurality of groups having no dependency with each other and the calculation of hologram values is parallelly performed, a large amount of calculation may be performed at a fast speed.

The above-described hologram generation apparatus may be employed in the holographic 3D image display apparatus and is capable of displaying a 3D image/motion picture in real time.

The method and apparatus for generating a hologram, and the holographic 3D image display apparatus, according to the present inventive concept may be employed by a variety of electronic apparatuses, for example, monitors, TVs, mobile display devices, or mobile communication devices.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While the method and apparatus for generating a hologram, and the holographic 3D image display apparatus, according to one or more exemplary embodiments of the present inventive concept have been described with reference to the figures, it will be understood by those of ordinary skill in the art that various changes in form and details may be made therein without departing from the spirit and scope of the present inventive concept as defined by the following claims.

What is claimed is:

1. A method of generating a hologram, the method comprising:
    dividing 3D image data into data groups which are independent from one another, by a first processor;
    calculating, from at least one of the data groups, hologram values to be displayed at respective positions on a hologram plane, by the first processor, the hologram values indicating values regarding an interference pattern by interference between an object wave and a reference wave, at the respective positions on the hologram plane, by object points in the at least one of the data groups;
    calculating, from at least another one of the data groups, hologram values to be displayed at the respective positions on the hologram plane by a second processor in parallel with the first processor, the hologram values indicating values regarding an interference pattern by interference between an object wave and a reference wave, at the respective positions on the hologram plane, by object points in at least another one of the data groups, and
    summing the calculated hologram values for each of the respective positions on the hologram plane, by the first processor or the second processor, or by the first processor and the second processor in parallel,
    wherein the dividing comprises dividing the 3D image data into the data groups based on primary color components of a color model set for the first processor,
    in the dividing of the 3D image data, image data of each of the data groups is divided into a plurality of depth images based on depth information from the hologram plane, and
    the method further comprises, with respect to each of plane images of the 3D image data defined by the primary color components and the depth information:
        calculating a diffraction limit;
        dividing each of the plane images into a plurality of divided images, each of the plurality of divided images having a size equal to the diffraction limit multiplied by the diffraction limit; and
        forming a plurality of sub-images by gathering image data at a same matrix position from each of the plurality of divided images.

2. The method of claim 1, wherein the primary color components correspond to red, green, and blue color components.

3. The method of claim 1, wherein the calculating comprises calculating the hologram values in parallel by dividing the 3D image data into 3N groups, and N is a number of the plurality of depth images.

4. The method of claim 1, wherein the calculating comprises calculating the hologram values in parallel by dividing the 3D image data into three groups having different color information, and calculations with respect to the plurality of depth images are sequentially processed in each of the three groups.

5. The method of claim 1, wherein the calculating comprises calculating the hologram values in parallel by dividing the 3D image data into N groups having different depth information, N is a number of the plurality of depth images, and calculations based on the primary color components are sequentially processed in each of the N groups.

6. The method of claim 1, wherein the dividing the 3D image data comprises:

analyzing a calculation time based on an amount of color image data included in the 3D image data; and dividing and distributing hologram calculation, to the first processor and the second processor, with respect to the plurality of sub-images formed for each of the primary color components and depth images.

7. The method of claim 1, wherein the calculating the hologram value comprises calculating hologram values with respect to the plurality of sub-images and summing the calculated hologram values to obtain a hologram value with respect to each of the plane images defined by the primary color components and the depth information.

8. A non-transitory computer readable storage medium storing a program that is executable by a computer to perform the method of claim 1.

9. An apparatus for generating a hologram, the apparatus comprising:

a controller comprising a first processor and a second processor that are configured to generate a hologram signal from three-dimensional (3D) image data, wherein the first processor is configured to divide the 3D image data into data groups which are independent from one another and calculate, from at least one of the data groups, hologram values to be displayed at respective positions on a hologram plane, the hologram values indicating values regarding an interference pattern by interference between an object wave and a reference wave, at the respective positions on the hologram plane, by object points in the at least one of the data groups, the second processor is configured to calculate, from at least another one of the data groups, hologram values to be displayed at the respective positions on the hologram plane, in parallel with the first processor, the hologram values indicating values regarding an interference pattern by interference between an object wave and a reference wave, at the respective positions on the hologram plane, by object points in at least another one of the data groups, at least one of the first processor and the second processor is further configured to sum the hologram values calculated by the first processor and the second processor, for each of the respective positions on the hologram plane, the first processor is further configured to convert the summed hologram values to data for a spatial light modulator, the first processor is further configured to divide the 3D image data into the data groups based on primary color components of a color model set for the first processor, the first processor is further configured to divide each of the data groups into a plurality of depth images based on depth information obtained from the hologram plane, and the first processor is further configured to, with respect to each of plane images of the 3D data image defined by the primary color components and the depth information, calculate a diffraction limit, divide each of the plane images into a plurality of divided images, each of the plurality of divided image having a size equal to the diffraction limit multiplied by the diffraction limit, and form a plurality of sub-images by gathering image data at a same matrix position from each of the plurality of divided images.

10. The apparatus of claim 9, wherein the controller is configured as a central processing unit or graphics processing unit comprising a plurality of processor cores.

11. The apparatus of claim 9, wherein the primary color components correspond to red, green, and blue color components.

12. The apparatus of claim 9, wherein the controller comprises 3N processor cores, and N is a number of the plurality of depth images.

13. The apparatus of claim 9, wherein the controller comprises N processor cores, and N is a number of the plurality of depth images.

14. A three-dimensional (3D) holographic image display apparatus comprising:

a light source;

a hologram generating apparatus comprising:

a controller comprising a first processor and a second processor that are configured to generate a hologram signal from three-dimensional (3D) image data, wherein the first processor is configured to divide the 3D image data into data groups which are independent from one another and calculate, from at least one of the data groups, hologram values to be displayed at respective positions on a hologram plane, the hologram values indicating values regarding an interference pattern by interference between an object wave and a reference wave, at the respective positions on the hologram plane, by object points in the at least one of the data groups, the second processor is configured to calculate, from at least another one of the data groups, hologram values to be displayed at the respective positions on the hologram plane, in parallel with the first processor, the hologram values indicating values regarding an interference pattern by interference between an object wave and a reference wave, at the respective positions on the hologram plane, by object points in at least another one of the data groups, at least one of the first processor and the second processor is further configured to sum the hologram values calculated by the first processor and the second processor, for each of the respective positions on the hologram plane, the first processor is further configured to convert the summed hologram values to data for a spatial light modulator, the first processor is further configured to divide the 3D image data into the data groups based on primary color components of a color model set for the first processor, the first processor is further configured to divide each of the data groups into a plurality of depth images based on depth information obtained from the hologram plane, and the first processor is further configured to, with respect to each of plane images of the 3D data image defined by the primary color components and the depth information, calculate a diffraction limit, divide each of the plane images into a plurality of divided images, each of the plurality of divided image having a size equal to the diffraction limit multiplied by the diffraction limit, and form a plurality of sub-images by gathering image data at a same matrix position from each of the plurality of divide images; and a spatial light modulator, to which the hologram signal formed in the hologram generating apparatus is applied and which modulates light from the light source according to the hologram signal.

* * * * *